United States Patent
Tang

(10) Patent No.: US 11,398,247 B1
(45) Date of Patent: Jul. 26, 2022

(54) MAGNETIC RECORDING MEDIA WITH OXIDIZED PRE-SEED LAYER

(71) Applicant: Western Digital Technologies, Inc., San Jose, CA (US)

(72) Inventor: Kai Tang, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/353,472

(22) Filed: Jun. 21, 2021

(51) Int. Cl.
| | |
|---|---|
| *G11B 5/65* | (2006.01) |
| *G11B 5/667* | (2006.01) |
| *G11B 5/012* | (2006.01) |
| *G11B 5/706* | (2006.01) |

(52) U.S. Cl.
CPC .......... *G11B 5/667* (2013.01); *G11B 5/012* (2013.01); *G11B 5/70615* (2013.01); *G11B 5/70621* (2013.01)

(58) Field of Classification Search
CPC ........... G11B 5/65; G11B 5/653; G11B 5/656; G11B 5/657
USPC ........................................................ 428/436
See application file for complete search history.

(56) References Cited

U.S. PATENT DOCUMENTS

| | | | |
|---|---|---|---|
| 5,866,227 A | 2/1999 | Chen et al. | |
| 6,117,570 A | 9/2000 | Chen et al. | |
| 6,620,531 B1 | 9/2003 | Cheng | |
| 6,863,993 B1 | 3/2005 | Doerner et al. | |
| 6,884,521 B2 * | 4/2005 | Takahashi | G11B 5/667 |
| | | | 428/141 |
| 7,470,475 B2 | 12/2008 | Ajan | |
| 7,588,843 B2 | 9/2009 | Iida et al. | |
| 8,824,084 B1 * | 9/2014 | Gurney | G11B 5/746 |
| | | | 428/836 |
| 2002/0164506 A1 | 11/2002 | Bian et al. | |
| 2021/0151076 A1 | 5/2021 | Tang | |

FOREIGN PATENT DOCUMENTS

EP          1930884 A1       6/2008

OTHER PUBLICATIONS

Mahvan, Nader et al., "Oxidation of Seed-Layer for Improved Magnetic & Recording Performance of Thin-Film Rigid Discs"; IEEE Transactions on Magnetics; vol. 29, No. 6; Nov. 1993; https://ieeexplore.IEEE.org/document/281271; 3 pages.

(Continued)

*Primary Examiner* — Nabil Z Hindi
(74) *Attorney, Agent, or Firm* — Loza & Loza, LLP; Gabriel Fitch

(57) ABSTRACT

Magnetic recording media including a soft magnetic underlayer (SUL) formed over an oxidized pre-seed layer. In some examples, the pre-seed layer is oxidized to reduce an amount of intermixing between the pre-seed layer and the SUL. The reduction in intermixing via oxidation can lead to improved recording performance of the recording media that are deposited on the SUL. In particular, media overwrite, signal-to-noise ratio (SNR), linear recording density, and areal recording density or areal density capacity (ADC) can be improved. In one aspect, a deposition apparatus may be modified to inject oxygen during pre-seed layer deposition to oxidize the pre-seed layer.

24 Claims, 8 Drawing Sheets

(56) References Cited

OTHER PUBLICATIONS

Chen, Qixu et al., "Effect of Cr Sub-seed Layer Thickness on the Crystallographic Orientation of Co-Alloy Recording Media on Glass"; IEEE Transactions on Magnetics; vol. 35, No. 5; Sep. 1999; https://ieeexplore.ieee.org/document/800923; 3 pages.
International Search Report and Written Opinion for International Application No. PCT/US2022/016473, dated May 19, 2022, 9 pages.

\* cited by examiner


MAGNETIC RECORDING MEDIA WITH OXIDIZED PRE-SEED LAYER

FIELD

Aspects of the present disclosure relate to magnetic recording media, and more specifically to magnetic recording media with substrates, pre-seed layers, and soft magnetic underlayers (SULs).

INTRODUCTION

Increasing the recording density of hard disk drives (HDDs) is becoming ever more challenging. Herein, techniques are presented for improving media overwrite, signal-to-noise ratio (SNR), linear recording density, and areal recording density or areal density capacity (ADC) within magnetitic recording media of HDDs, especially for use in magnetic recording media structures that include a soft magnetic underlayer (SUL) formed over a substrate or over a pre-seed layer.

SUMMARY

One aspect of the present disclosure provides a magnetic recording medium that includes: a substrate; an oxidized pre-seed layer on the substrate; a soft magnetic underlayer (SUL) on the oxidized pre-seed layer; and at least one magnetic recording layer on the SUL.

Another aspect of the present disclosure provides a method for fabricating a magnetic recording medium. The method includes: providing a substrate; providing an oxidized pre-seed layer on the substrate; providing an SUL on the oxidized pre-seed layer; and providing at least one magnetic recording layer on the SUL.

Yet another aspect of the present disclosure provides a magnetic recording medium that includes: a non-conducting substrate; an oxidized metal pre-seed layer on the non-conducting substrate; a soft magnetic underlayer (SUL) on the oxidized metal pre-seed layer; one or more intermediate layers on the SUL; and at least one magnetic recording layer on the one or more intermediate layers.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Substrates are used for hard disk drive (HDD) media. In general, the substrates can be categorized as electrically conductive (e.g., NiP-plated Al) or non-electrically-conductive (e.g., glass or ceramic). For non-conducting substrates, a pre-seed layer may be used to generate a suitable electrical connection so that electrical bias can be applied during film deposition of the magnetic recording magnetic recording layers. A pre-seed layer may include a relatively thick metal layer in order to provide low resistance. Pre-seed thickness is typically around 29 to 59 nanometers (nm). A pre-seed layer can also be used for other purposes, such as process control and mechanical property enhancement, e.g., enhancement of adhesion, corrosion-resistance, and hardness (which are applicable to both non-conductive and conductive substrates). The pre-seed layer may be comprised of a metallic alloy, such as CrTi and NiTa, etc.

Herein, deposition and/or treatment processes of the pre-seed layer are provided to improve recording performance of the recording media that are deposited on or above the SUL. For example, oxidation of the pre-seed layer can be used to improve recording performance. In some aspects, the oxidation of the pre-seed layer is provided by an amount sufficient to reduce an amount of intermixing between the pre-seed layer and the SUL to improve recording performance. Additionally, the SUL moment of magnetization (Ms) can become higher and media orientation can be improved. The increase of Ms of SUL contributes to an increase of OW2 of the media, wherein OW2 (which sometimes may be referred to as "write-ability overwrite" or "reverse overwrite") is a measure of perpendicular overwrite (e.g. a measure of how much of an old signal remains in the recording medium after a new write signal is applied).

Co-pending U.S. patent application Ser. No. 17/353,456, filed contemporaneously herewith, entitled "MAGNETIC RECORDING MEDIA WITH PLASMA-POLISHED PRE-SEED LAYER OR SUBSTRATE," and assigned to the assignee of the present application, is fully incorporated by reference herein for all purposes, and it should be understood that various features and inventions of the present application and the co-pending application can be practiced together. By way of example and not limitation, a magnetic recording medium may be provided that includes a pre-seed layer that is oxidized and plasma-polished.

Disk Drive with Magnetic Recording Media

Figure 1:
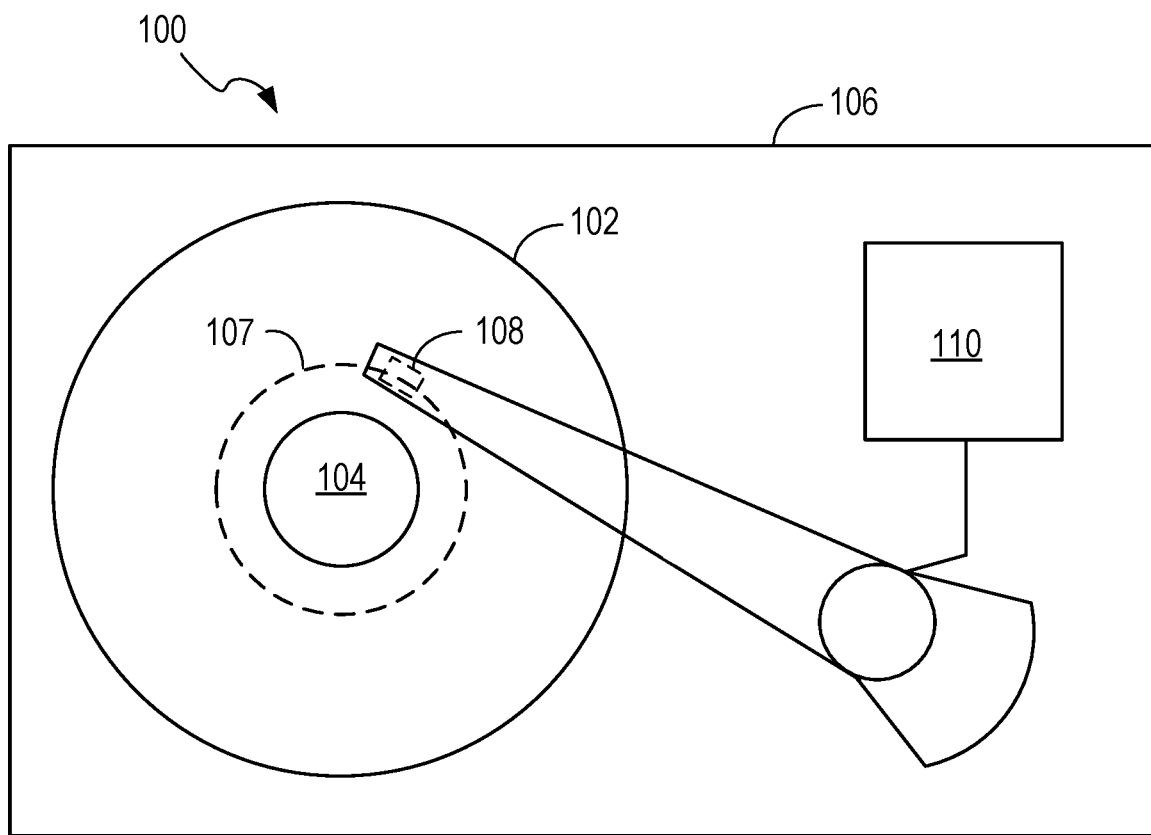
FIG. 1 is a top schematic view of a disk drive configured for magnetic recording and including a magnetic recording medium having an oxidized pre-seed layer in accordance with an embodiment of the disclosure.

FIG. 1 is a top schematic view of a disk drive 100 configured for magnetic recording and including a magnetic recording medium 102 having an oxidized pre-seed layer in accordance with one embodiment of the disclosure. In illustrative examples, the magnetic recording medium 102 includes a perpendicular magnetic recording (PMR) medium. However, other recording media, such shingle-written magnetic recording (SMR) media, microwave assisted magnetic recording (MAMR) media or heat assisted magnetic recording (HAMR) may be used in other examples. Disk drive 100 may include one or more disks/media 102 to store data. Disk/media 102 resides on a spindle assembly 104 that is mounted to drive housing 106. Data may be stored along tracks 107 in the magnetic recording layer of disk 102. The reading and writing of data is accomplished with the head/slider 108 that may have both read and write elements. The write element is used to alter the properties of the magnetic recording layer of disk 102 and thereby write information thereto. In one embodiment, recording head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates disk 102 to position head 108 at a particular location along a desired disk track 107. The position of the head 108 relative to the disk 102 may be controlled by position control circuitry 110.

Figure 2:
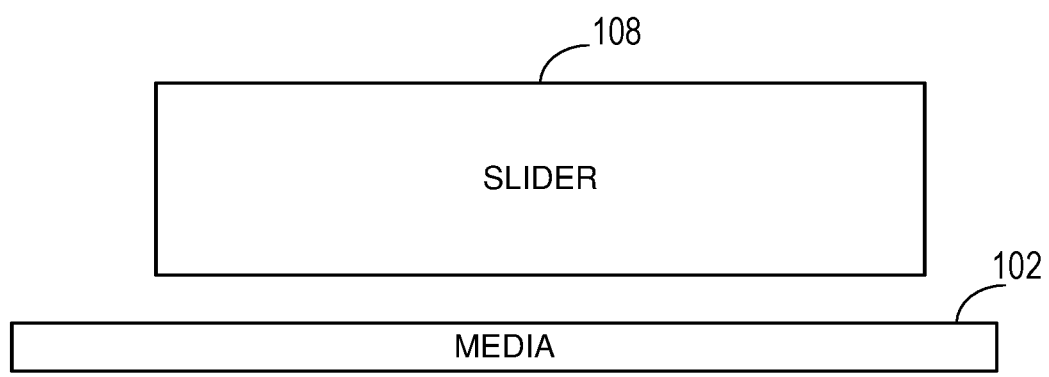
FIG. 2 is a side cross sectional schematic view of selected components of the magnetic recording system of FIG. 1 including the magnetic recording medium having the oxidized pre-seed layer in accordance with an embodiment of the disclosure.

FIG. 2 is a side cross sectional schematic view of selected components of the magnetic recording system of FIG. 1 including the magnetic recording medium 102 with the oxidized pre-seed layer in accordance with one embodiment of the disclosure. The head/slider 108 is positioned above the medium 102. The head/slider 108 includes a write element and a read element (not shown) positioned along an air bearing surface (ABS) of the slider (e.g., bottom surface) for writing information to, and reading information from, respectively, the medium 102. FIGS. 1 and 2 illustrate a specific example of a magnetic recording system. In other examples, embodiments of the improved media with the oxidized pre-seed layer disclosed herein can be used in any suitable magnetic recording systems (e.g., such as PMR, SMR, HAMR, and MAMR recording systems). For example, the magnetic recording media of various embodiments disclosed herein may be flexible media in the form a magnetic tape used in a tape-based data storage drive/system. For simplicity of description the various embodiments are primarily described in the context of an example HDD magnetic recording system.

Magnetic Recording Media with Oxidized Pre-Seed Layer

Figure 3:
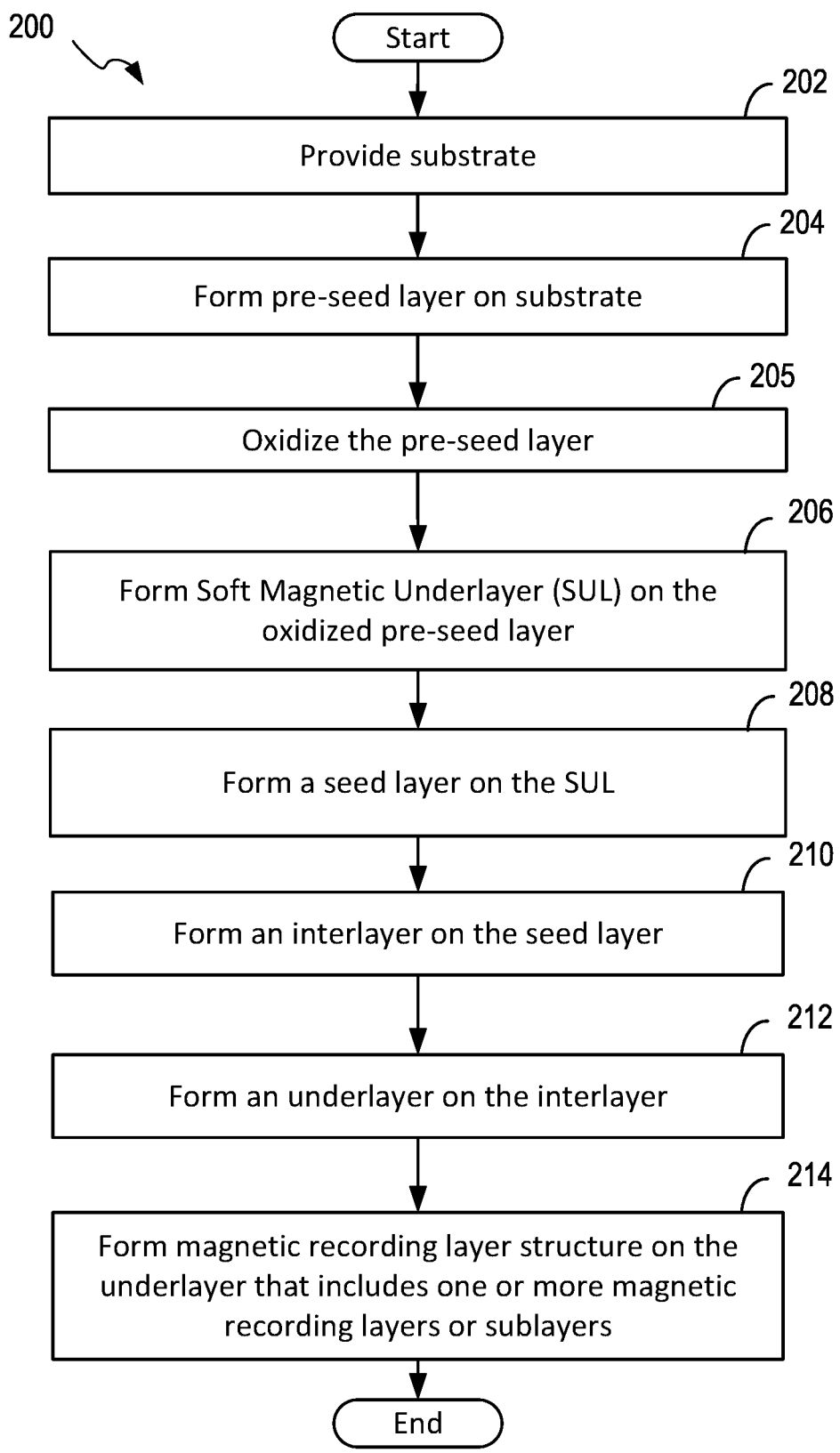
FIG. 3 is a flowchart of a process for fabricating a magnetic recording medium including an SUL formed on an oxidized pre-seed layer in accordance with an embodiment of the disclosure.

FIG. 3 is a flowchart of a process 200 for fabricating a magnetic recording medium including an oxidized pre-seed layer. In particular embodiments, the process 200 can be used to fabricate the magnetic recording medium 102 of FIGS. 1 and 2.

At block 202, the process provides a substrate. In some examples, the substrate is made of one or more non-conductive materials such glass, glass ceramic, and/or combinations thereof. In one or more embodiments for magnetic tape recording applications, the substrate can include a flexible material, such a film made of one of various types of resins, polyesters, polyolefins, polyamides, and the like, or combinations thereof. The substrate may include non-magnetic materials, and may be laminated. In these non-conductive substrate examples, since the substrate is non-conductive, a conductive pre-seed layer is added, which is discussed below. (Note, though, that in at least some embodiments, the substrate might be conductive, such as an Al alloy or NiP plated Al.) In some examples, the substrate has a diameter of about 97 millimeters or less. In other embodiments, the diameter may vary.

At block 204, a pre-seed layer is formed on the substrate. In some examples, the pre-seed layer is formed of CrTi or NiTa, or combinations thereof. The pre-seed layer can be amorphous or crystalline. At block 205, the pre-seed layer is oxidized. Note that, in some embodiments, the pre-seed layer may be oxidized as it is formed (i.e. during block 204). In other embodiments, as indicated by block 205, the pre-seed layer may be oxidized after the pre-seed layer has been deposited on the substrate. In some examples, the forming or deposition of the pre-seed layer (as well as the other sublayers of the medium) can be performed using a variety of deposition sub-processes, including, but not limited to physical vapor deposition (PVD), direct current (DC) sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (AL-CVD). Other suitable deposition techniques known in the art may also be used.

Note that, ordinarily, oxygen is not employed during such deposition processes since oxidation of the metal layers of a recording media structure for HDD is considered disadvantageous. However, during block 205, oxygen is pumped into the deposition chamber so that at least some of the metal constituents of the pre-seed layer are oxidized, e.g. at least some portion of CrTi is oxidized to form oxides of CrTi and/or at least some portion of NiTa is oxidized to form oxides of NiTa. In at least some examples, the entire top surface of the pre-seed layer is uniformly oxidized (or at least that portion of the top surface upon which an SUL will be deposited). Accordingly, following oxidation, at least the top surface of the pre-seed layer has at least some oxidized forms of its constituent metal compounds.

At block 206, an amorphous SUL is formed on the oxidized pre-seed layer. It is believed that by oxidizing the top surface or top portions of the pre-seed layer, the SUL thus has improved properties, which in turn provide for improved magnetic recording performance of the magnetic recording layers formed atop the SUL. In some examples, a top portion of the pre-seed layer having a thickness in the range of 0.3 nm to 3 nm is oxidized. In other words, the top portion of the pre-seed layer that is oxidized has a thickness in the range of 0.3 nm to 3 nm. (As noted above, the pre-seed layer may have a thickness around 29 nm to 59 nm, and so, in some examples, only the top 0.3 nm to 3 nm of that thickness is oxidized.) In some examples, a top portion of the pre-seed layer is oxidized to have an oxygen atomic percentage in the range of 40 to 80 (at %). In other words, the top portion of the pre-seed layer that is oxidized has an oxygen atomic percentage in the range of 40 to 80 (at %).

In some examples, the thickness of the oxidized metal within the pre-seed layer and/or the oxygen concentration in the oxidized metal within the pre-seed layer are selected such that an areal density capacity (ADC) of a resulting magnetic recording medium is at least 0.5% greater than an ADC for a corresponding magnetic recording medium with a pre-seed layer that is not oxidized (e.g., a magnetic medium that is identical except that the pre-seed layer is not oxidized). In some examples, OW2 can be improved by 1.8 dB (e.g., from 26.2 dB to 28.0 dB), SNR can be improved by 0.1-0.3 dB, and ADC can be 0.6%. In some examples, a Polar Kerr analysis of SUL/magnetic seed layer stack indicates Ms is increased from 319 emu/cc when deposited on top of unoxidized pre-seed to 344 emu/cc when deposited on top of oxidized pre-seed. In some examples, a Polar Kerr analysis of SUL/magnetic seed layer stack indicates Ms when deposited on top of oxidized pre-seed is thus increased by 5-10% from the Ms value when deposited on top of unoxidized pre-seed.

In some examples, the thickness of the oxidized metal within the pre-seed layer and/or the oxygen concentration in the oxidized metal within the pre-seed layer are selected to reduce an amount of intermixing between the pre-seed layer and an SUL as compared to an amount of intermixing in a corresponding magnetic recording medium with a pre-seed layer that is not oxidized (e.g., a magnetic recording medium that is identical except that the pre-seed layer is not oxidized). Moreover, in some examples, the top portion of the pre-seed layer is oxidized during a final stage of the deposition process that forms the pre-seed layer to provide a gradient in the percentage or amount of oxidation within the top portion, with the percentage of oxidation increasing toward the SUL. The gradient may be achieved, for example, by introducing oxygen during the final deposition stage of the pre-seed layer and increasing the oxygen concentration in the deposition chamber as the top portion of the pre-seed layer is being formed and/or by exposing the pre-seed layer to an oxygen environment after it is formed, or by using other suitable techniques that result in a greater amount of oxidation closer to the surface of the pre-seed layer as opposed to farther from the surface. Note that it may not be desirable to deposit the entire pre-seed layer in an oxygen environment.

Note that the SUL can be made of one or more materials, such as cobalt, iron, e.g. CoFe, and molybdenum, tantalum, niobium, boron, chromium, or other soft magnetic material, or combinations thereof. In one aspect, the SUL may include two soft magnetic underlayers separated by an anti-ferromagnetic coupling (AFC) layer, such as ruthenium (Ru) or other AFC material. The SUL may be configured to support magnetization of magnetic recording media during data storage operations. More specifically, the SUL may be configured to provide a return path for a magnetic field applied during a write operation.

At block 208, a seed layer is formed on the SUL. The seed layer can be made of one or more materials, such as those containing elements of Ni, W, Fe, Cr, Al, combinations thereof, and/or other suitable materials known in the art. In one aspect, the SUL and seed layer are deposited at an ambient room temperature (e.g., without applying heat prior to or during deposition). At block 210, an interlayer is formed on the seed layer. At 212, an underlayer is formed on the interlayer. The interlayer and the underlayer may be referred to as intermediate layers. The one or more intermediate layers can be made of one or more materials, such as those containing elements of Co, Cr, Ru, and/or other suitable materials known in the art.

At block 214, a magnetic recording layer structure is formed on the interlayer with the magnetic recording layer structure including one or more magnetic recording sublayers. The magnetic recording media sublayers may alternate with non-magnetic exchange control layers within the magnetic recording layer structure. The magnetic recording sublayers can be made of one or more magnetic materials, such as CoPt and/or CoCrPt, or other magnetic materials suitable for storing information magnetically. In some examples, the magnetic recording sublayers are made of a cobalt alloy including platinum. One or more of the magnetic recording sublayers may further include one or more additional materials, such as those containing elements of Cr, B, Ru, and/or combinations thereof. In one aspect, each of the magnetic recording sublayers includes magnetic grains (e.g., made of a cobalt alloy including platinum, such as CoPt and/or CoCrPt) embedded within a mixture of one or more oxide segregants. Suitable oxide segregants may include, but are not limited to, $SiO_2$, $TiO_2$, $Cr_2O_3$, $B_2O_3$, CoO, $Co_3O_4$, and/or combinations thereof. In some examples, a top magnetic recording sublayer may include at least the oxide segregant of $TiO_2$. The non-magnetic exchange control sublayers can be made of one or more materials, such as CoRu and/or CoRuCr with an oxide segregant, such as $TiO_2$, or other suitable non-magnetic material. In one aspect, the magnetic recording layer structure may be deposited at a temperature of about 150 degrees Celsius, or a temperature in the range from 50 to 340 degrees Celsius.

In one embodiment, the magnetic recording layer structure may also include a capping layer. In such case, the capping layer can be made of one or more materials such as Co, Pt, Cr, B, combinations thereof, and/or other suitable materials known in the art. Still further, an overcoat may be formed on a top surface of the magnetic recording layer structure, such as a carbon overcoat. In one embodiment, a lubricant layer may be applied on top of the overcoat. In such case, the lubricant layer can be made of one or more materials such as a polymer based lubricant and/or other suitable materials known in the art.

Note that FIG. 3 provides an illustrative example of a process for fabricating a magnetic recording medium including an oxidized pre-seed layer. In other examples, more or fewer processing stages may be employed.

In one embodiment, the process can perform the sequence of actions in a different order (although the oxidation of the pre-seed layer should precede the deposition of the SUL and the layers above the SUL to provide the aforementioned improved recording performance). In another embodiment, the process can skip one or more of the other actions. In other embodiments, one or more actions are performed simultaneously. In some embodiments, additional actions can be performed. For example, in one aspect, the process may include any additional actions needed to fabricate the magnetic layer structure of the media.

Figure 4:
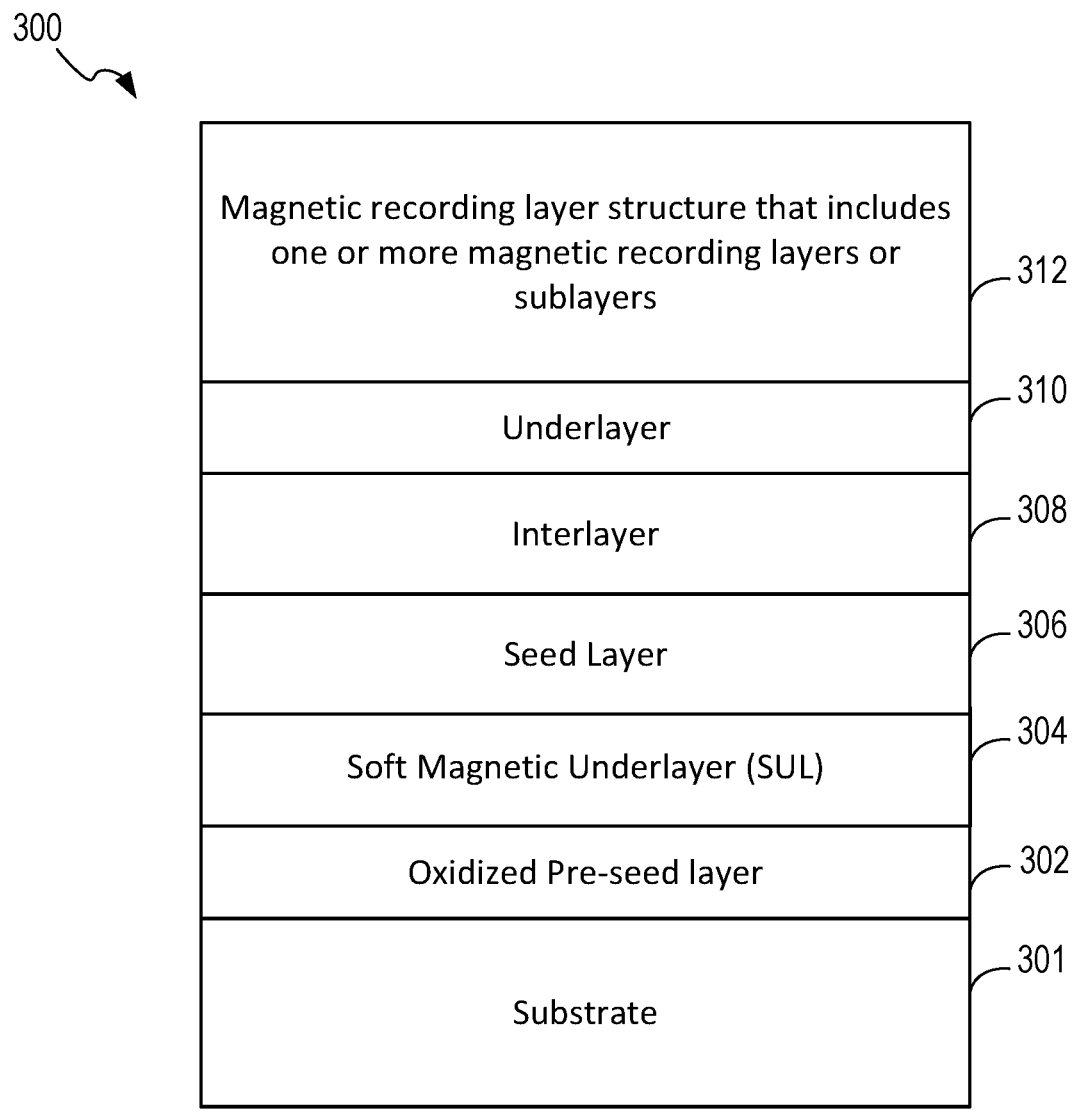
FIG. 4 is a side cross sectional view of a magnetic recording medium having an SUL formed on an oxidized pre-seed layer in accordance with an embodiment of the disclosure.

FIG. 4 is a side cross sectional view of a magnetic recording medium 300, which may be fabricated using the process of FIG. 3 or other suitable processes. In particular embodiments, the magnetic recording medium 300 can be used in conjunction with the disk drive 100 of FIGS. 1 and 2, or a magnetic tape drive. In sequence from the bottom, the medium 300 includes a substrate 301, an oxidized pre-seed layer (where, e.g., at least a top surface portion of the pre-seed layer 302 is oxidized with, in some, examples, a gradient in oxidation, as described above), an SUL 304, a seed layer 306, an interlayer 308, an underlayer 310, and a magnetic recording layer structure 312 that includes one or more media sublayers. As already explained, the magnetic recording sublayers may alternate with exchange control layers within magnetic recording structure. As also explained, more or fewer layers may be provided within the medium 300, such as an additional overcoat on the magnetic recording layer structure 312, or omission of the underlayer 310 or interlayer 308.

The various layers and sublayers may be formed to have the exemplary constituents or component materials described above in connection with FIG. 3. As explained, following oxidation of the pre-seed layer 302, at least a top surface portion of the pre-seed layer 302 will have at least some of the oxidized metal alloys, compounds, or constituents therein.

Deposition/Oxidation System

Figure 5:
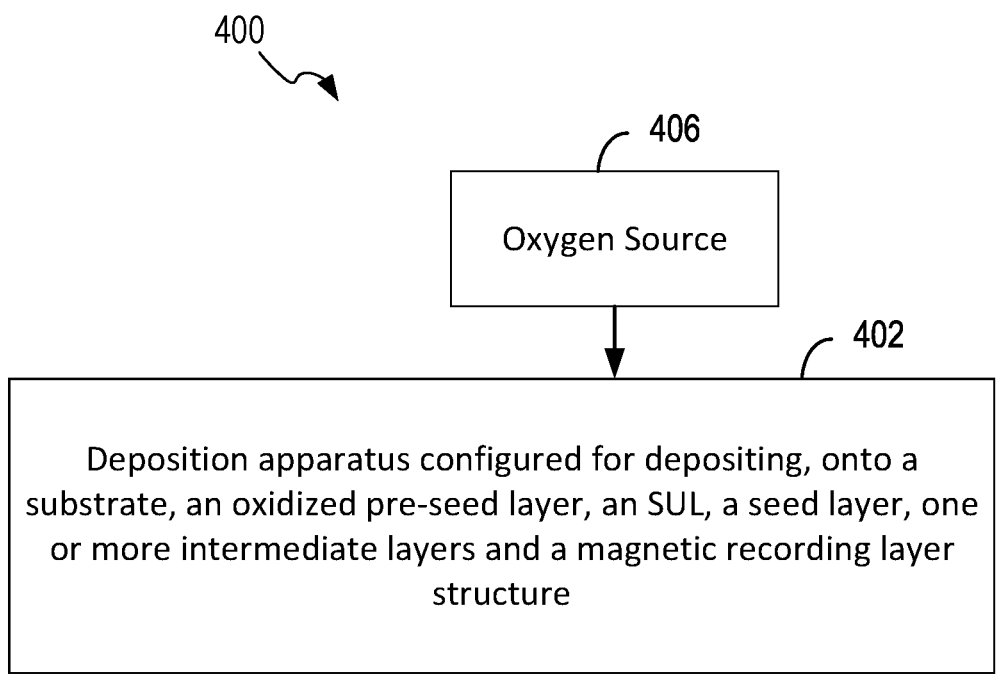
FIG. 5 is a block diagram of a system including an apparatus for oxidizing a pre-seed layer during layer deposition in accordance with an embodiment of the disclosure.

FIG. 5 illustrates a system 400 that may be used to deposit various layers including a pre-seed layer on a substrate to form a magnetic recording medium and to selectively oxidize the pre-seed layer. Briefly, the system 400 includes a deposition apparatus 402 configured for depositing, onto a substrate, a pre-seed layer, an SUL, a seed layer, one or more intermediate layers, and a magnetic recording layer structure. The deposition apparatus may be, for example, configured to perform one or more of: PVD, DC sputter deposition, ion beam deposition, radio frequency sputter deposition, or CVD, including PECVD, LPCVD, and ALCVD. The deposition apparatus 402 may include one or more individual apparatus stations, components, or systems for depositing different layers. The system 400 also includes an oxygen source. Oxygen is introduced into a deposition chamber of the deposition apparatus 402 while the pre-seed layer is being formed (or after it is formed) so as to oxidize the pre-seed layer.

With the system of FIG. 5, the method of FIG. 3 may be performed to fabricate the medium of FIG. 4 by inserting the substrate into the deposition apparatus 402 and controlling the deposition apparatus 402 to deposit a pre-seed layer in the presence of oxygen supplied by the oxygen source 406 to oxidize the pre-seed layer by some desired amount (which may be controlled by the amount of oxygen admitted into the chamber and other factors such as deposition temperature, etc.). In one example, where the deposition apparatus is a DC magnetron apparatus operating at a temperature of 50 degree Celsius, the oxygen source is configured to provide a flow of oxygen into the deposition apparatus in a duration that is set to generate a thickness of the oxidized metal within the pre-seed layer and/or an oxygen concentration in the oxidized metal within the pre-seed layer so that an areal density capacity (ADC) of the magnetic recording medium is at least 0.5% greater than an ADC for a corresponding magnetic recording medium with a pre-seed layer that is not oxidized. The oxygen source is 406 is then shut off and other components (such as a vacuum pump, not shown) can be used to flush the oxygen from the deposition chamber of the deposition apparatus 402 and create a vacuum therein (if appropriate for depositing the remaining layers). In some examples, inert gasses may be introduced into the chamber (if appropriate for depositing the remaining layers). Hence, in some examples, the deposition of the pre-seed layer is performed in the presence of both the inert gas and the oxygen.

Additional Methods and Apparatus

Figure 6:
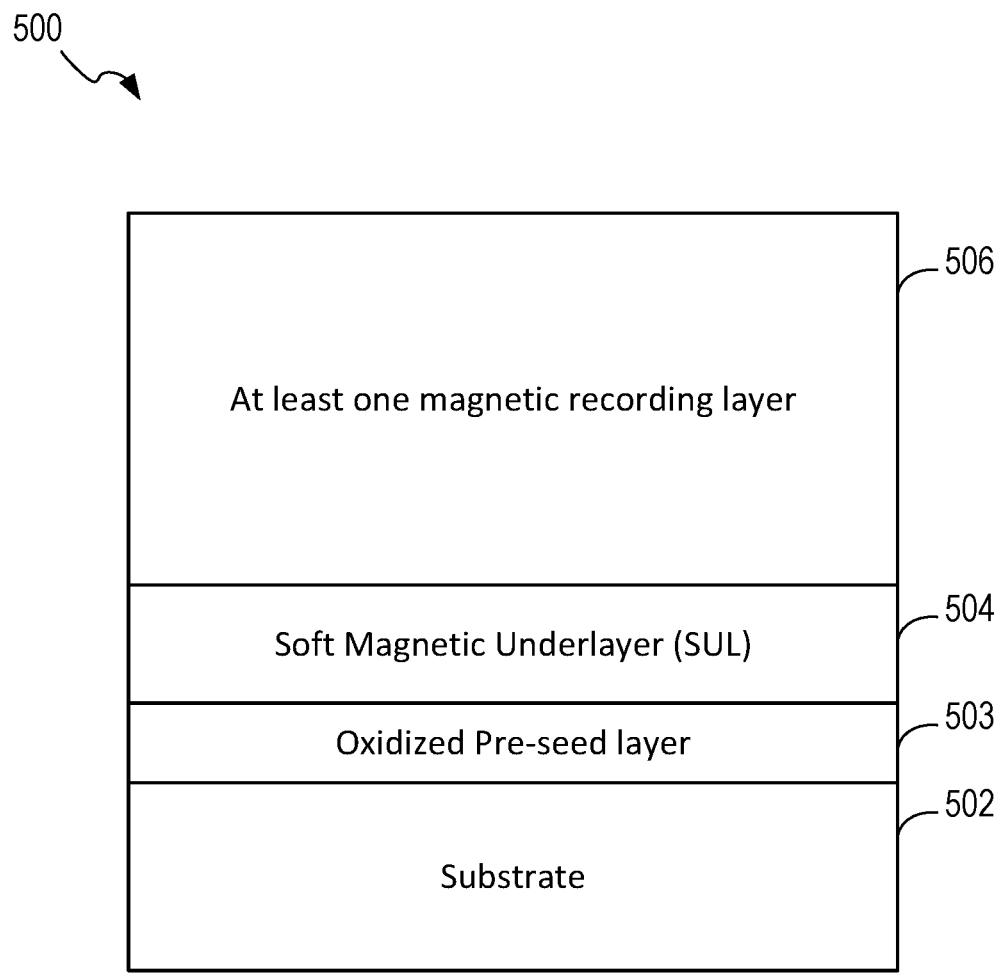
FIG. 6 is a side cross sectional view of a magnetic recording medium having an SUL on an oxidized pre-seed layer in accordance with an embodiment of the disclosure.

FIG. 6 illustrates an exemplary magnetic recording medium 500. Magnetic recording medium 500 includes: a substrate 502; an oxidized pre-seed layer 503; an SUL 504 on the pre-seed layer 503; and at least one magnetic recording layer 506 on or over the SUL 504. The entire surface of the pre-seed layer 503 upon which the SUL 504 is formed or positioned may be oxidized. Additional layers or coatings may be provided between the SUL 504 and the at least one magnetic recording layer 506, such as a seed layer and one or more intermediate layers, and one or more capping or lubricant layers may be provided above the at least magnetic recording layer 506. A magnetic recording layer structure may be formed that includes a plurality of the magnetic recording layers 506 and non-magnetic exchange control layers (not shown). See, above, for exemplary component materials or constituents of the various layers. As already noted, additional layers may be provided such as a seed layer, underlayers, interlayers, or overcoats.

Figure 7:
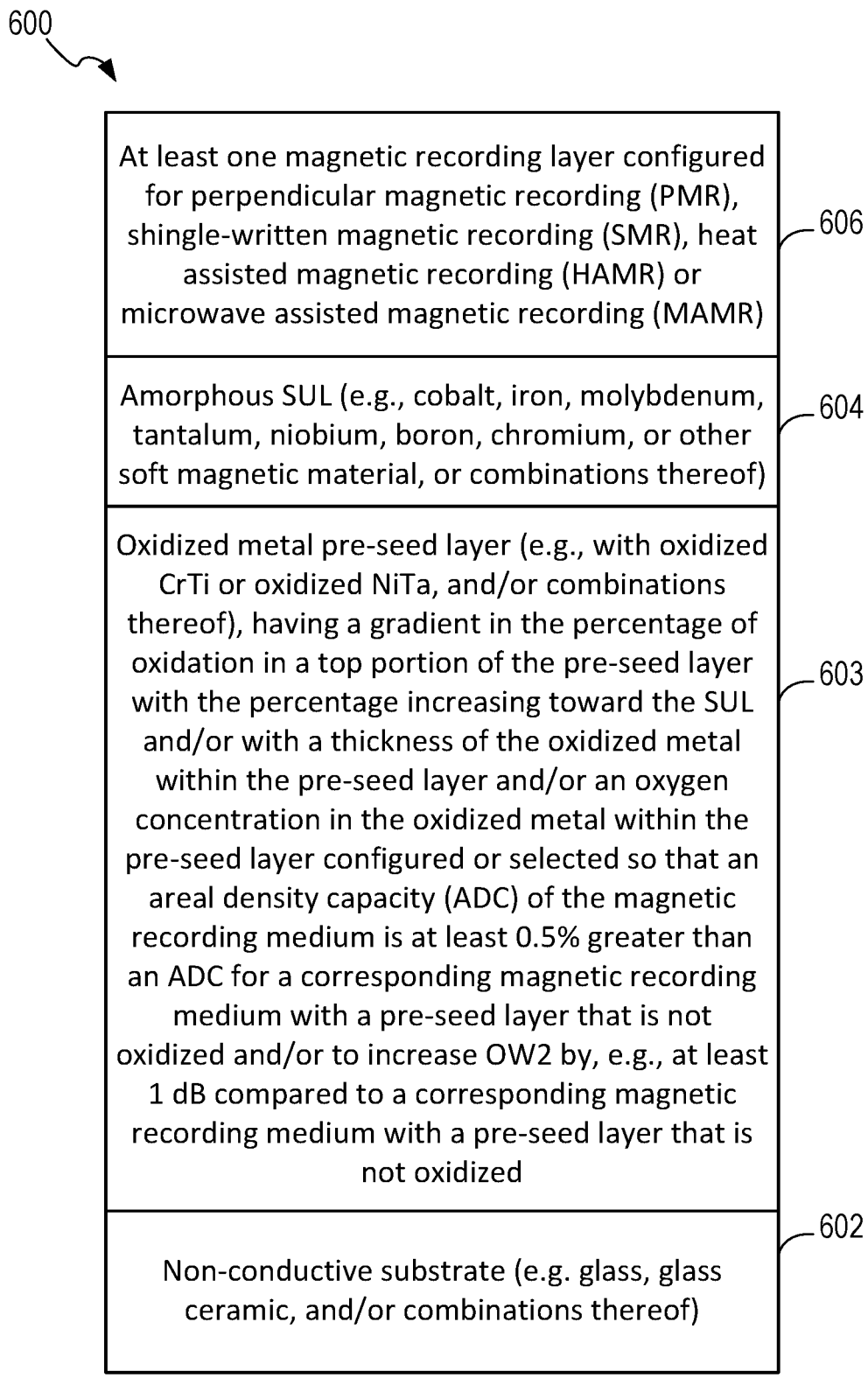
FIG. 7 is another side cross sectional view of a magnetic recording medium having an SUL on an oxidized pre-seed layer in accordance with an embodiment of the disclosure.

FIG. 7 illustrates another exemplary magnetic recording medium 600. Magnetic recording medium 600 includes: a non-conductive substrate 602 (e.g., glass, glass ceramic, and/or combinations thereof); an oxidized metal pre-seed layer 603 (e.g., including oxidized CrTi or oxidized NiTa, and/or combinations thereof) on the substrate 602; an amorphous SUL 604 (e.g., cobalt, iron, molybdenum, tantalum, niobium, boron, chromium, or other soft magnetic material, or combinations thereof) on the pre-seed layer 603; and at least one magnetic recording layer 606 on or over the SUL 604 where the at least one magnetic recording layer configured for PMR, SMR, HAMR, or MAMR. The pre-seed layer 603 has a gradient in the percentage of oxidation through the pre-seed layer, with the percentage increasing from the substrate 602 toward the SUL 604. Additionally or alternatively, the thickness of the oxidized metal within the pre-seed layer and/or the oxygen concentration in the oxidized metal within the pre-seed layer are selected so that the ADC of the magnetic recording medium is at least 0.5% greater than an ADC for a corresponding magnetic recording medium with a pre-seed layer that is not oxidized and/or to increase OW2 by, e.g., at least 1 dB as compared to a corresponding magnetic recording medium with a pre-seed layer that is not oxidized.

Additional layers or coatings may be provided, such as a seed layer and one or more intermediate layers between the SUL 604 and the at least one magnetic recording layer 606, or one or more capping or lubricant layers above the at least magnetic recording layer 606. A magnetic recording layer structure may be provided that includes a plurality of the magnetic recording layers 606 and non-magnetic exchange control layers (not shown). As noted, additional layers may be provided such as a seed layer, underlayers, interlayers, or overcoats.

Figure 8:
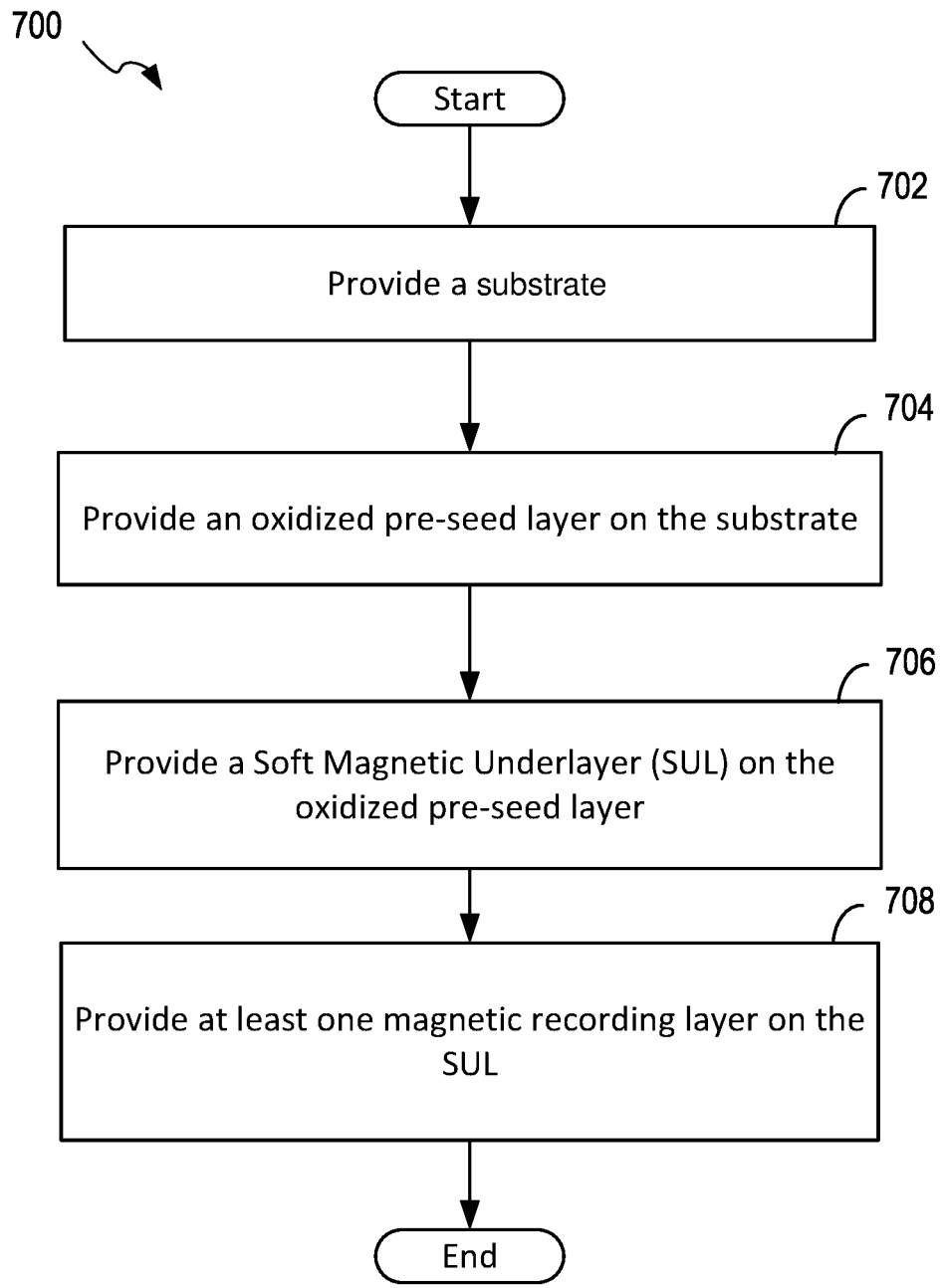
FIG. 8 is another flowchart of a process for fabricating a magnetic recording medium including an SUL on an oxidized pre-seed layer in accordance with an embodiment of the disclosure.

FIG. 8 summarizes an exemplary method 700 for forming a magnetic recording medium. Briefly, at 702, a substrate is provided. At 704, a deposition apparatus is used to form an oxidized pre-seed layer over the substrate. As already explained, in some examples the pre-seed layer is oxidizes as it is formed or deposited. In other examples, the pre-seed layer is deposited and then it is oxidized after deposition. At 706, the deposition apparatus is used to form an SUL on the oxidized pre-seed layer. At 708, the deposition apparatus is used to form at least one magnetic recording layer on the SUL (such as a magnetic recording layer configured for PMR, SMR, HAMR, or MAMR). As noted, additional layers may be provided such as a seed layer, underlayers, interlayers, or overcoats.

Figure 9:
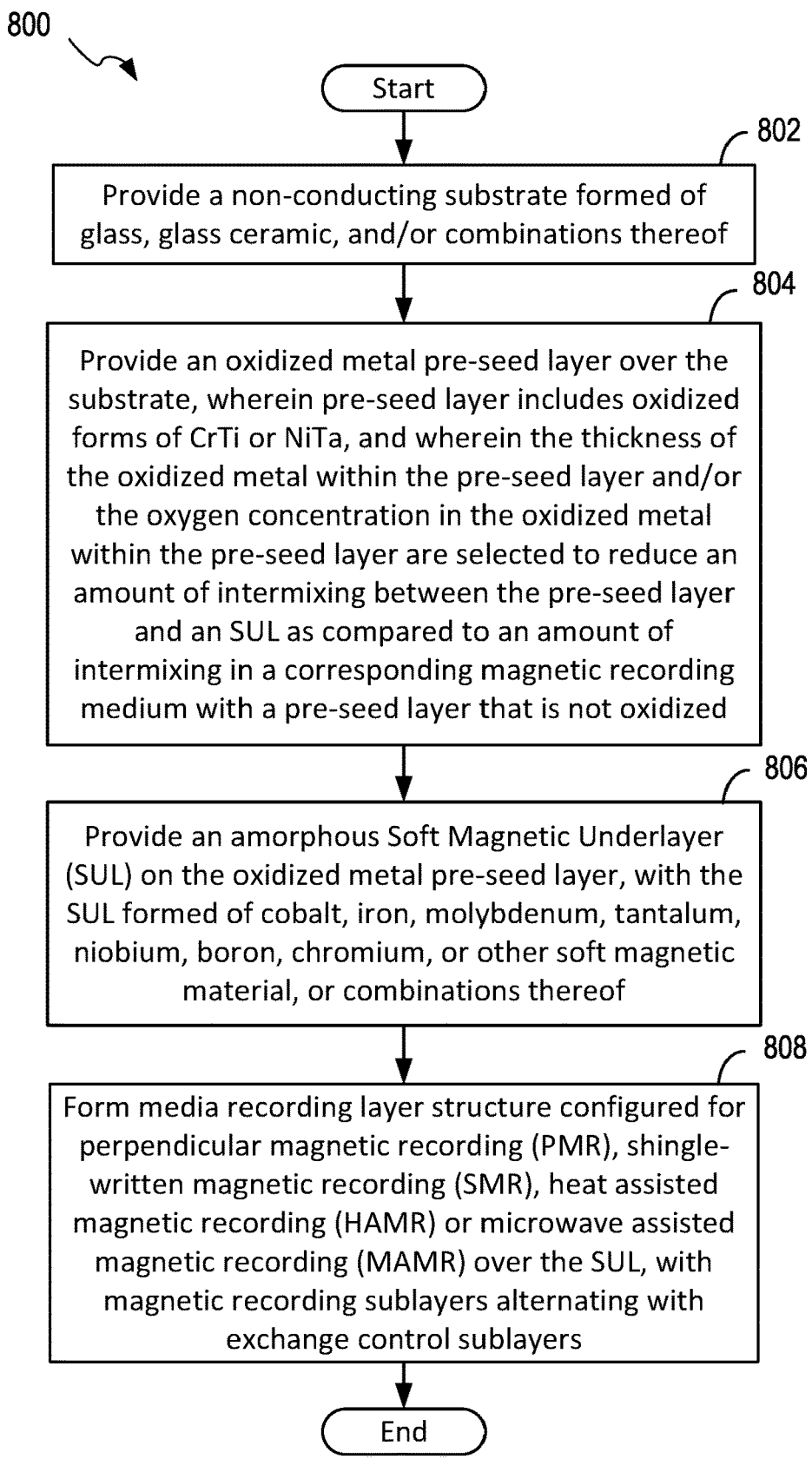
FIG. 9 is another flowchart of a process for fabricating a magnetic recording medium including an SUL on an oxidized pre-seed layer in accordance with an embodiment of the disclosure.

FIG. 9 summarizes an exemplary method 800 for forming a magnetic recording medium. Briefly, at 802, a non-conducting substrate formed of glass, glass ceramic, and/or combinations thereof is provided. At 804, a deposition apparatus is used to form an oxidized metal pre-seed layer over the substrate, wherein the pre-seed layer includes oxidized forms of CrTi or NiTa, and wherein the thickness of the oxidized metal within the pre-seed layer and/or the oxygen concentration in the oxidized metal within the pre-seed layer are selected to reduce an amount of intermixing between the pre-seed layer and an SUL as compared to an amount of intermixing in a corresponding magnetic recording medium with a pre-seed layer that is not oxidized. As already explained, in some examples the pre-seed layer is oxidizes as it is formed or deposited. In other examples, the pre-seed layer is deposited and then it is oxidized after deposition. At 806, the deposition apparatus is used to form an amorphous SUL on the oxidized metal pre-seed layer, with the SUL formed of cobalt, iron, molybdenum, tantalum, niobium, boron, chromium, or other soft magnetic material, or combinations thereof. At 808, the deposition apparatus is used to form a magnetic recording layer structure configured for PMR, SMR, HAMR, or MAMR over the SUL, with magnetic recording media sublayers alternating with exchange control sublayers. As noted, additional layers may be provided such as a seed layer, underlayers, interlayers, or overcoats.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic recording medium, comprising:
a substrate;
an oxidized pre-seed layer on the substrate;
a soft magnetic underlayer (SUL) on the oxidized pre-seed layer; and
at least one magnetic recording layer on the SUL,
wherein a percentage concentration of an oxidized metal within the pre-seed layer has a gradient within at least a top portion of the pre-seed layer with oxidation increasing toward the SUL.

2. The magnetic recording medium of claim 1, wherein the substrate is made of a non-conductive material.

3. The magnetic recording medium of claim 1, wherein the oxidized metal comprises one or more of oxidized CrTi or oxidized NiTa.

4. A magnetic recording medium, comprising:
a substrate;
an oxidized pre-seed layer on the substrate;
a soft magnetic underlayer (SUL) on the oxidized pre-seed layer; and
at least one magnetic recording layer on the SUL,
wherein a top portion of the pre-seed layer that is oxidized has a thickness in the range of 0.3 nanometers (nm) to 3 nm.

5. The magnetic recording medium of claim 1, wherein a top portion of the pre-seed layer that is oxidized has an oxygen atomic percentage in the range of 40 to 80 (at %).

6. The magnetic recording medium of claim 1, wherein at least one of: (1) a thickness of the oxidized metal within the pre-seed layer and (2) an oxygen concentration in the oxidized metal within the pre-seed layer is configured so that an areal density capacity (ADC) of the magnetic recording medium is at least 0.5% greater than an ADC for a corresponding magnetic recording medium with a pre-seed layer that is not oxidized.

7. The magnetic recording medium of claim 1, wherein the SUL covers a surface portion of the pre-seed layer and wherein the surface portion covered by the SUL is oxidized.

8. The magnetic recording medium of claim 1, wherein the SUL comprises a material selected from the group consisting of: cobalt, iron, molybdenum, tantalum, niobium, boron, chromium, and combinations thereof.

9. The magnetic recording medium of claim 1, wherein the SUL is configured to provide a return path for a magnetic field applied to the magnetic recording medium during a write operation.

10. A magnetic recording device, comprising:
the magnetic recording medium of claim 1; and
a recording head configured to write information to the magnetic recording medium.

11. A method for fabricating a magnetic recording medium, comprising:
providing a substrate;
providing an oxidized pre-seed layer on the substrate;
providing a soft magnetic underlayer (SUL) on the oxidized pre-seed layer; and
providing at least one magnetic recording layer on the SUL,
wherein a percentage concentration of an oxidized metal within the pre-seed layer has a gradient within at least a top portion of the pre-seed layer with oxidation increasing toward the SUL.

12. The method of claim 11, wherein the pre-seed layer is oxidized as the pre-seed layer is formed on the substrate.

13. The method of claim 11, wherein the pre-seed layer is oxidized after the pre-seed layer is formed on the substrate and before the SUL is provided.

14. The method of claim 11, wherein the substrate is made of a non-conductive material and the pre-seed layer comprises the oxidized metal.

15. The method of claim 14, wherein at least one of: (1) a thickness of the oxidized metal within the pre-seed layer and (2) an oxygen concentration in the oxidized metal within the pre-seed layer is selected to reduce an amount of intermixing between the pre-seed layer and the SUL as compared to an amount of intermixing in a corresponding magnetic recording medium with a pre-seed layer that is not oxidized.

16. The method of claim 14, wherein at least one of: (1) a thickness of the oxidized metal within the pre-seed layer and (2) an oxygen concentration in the oxidized metal within the pre-seed layer is selected to increase a measure of overwrite of the magnetic recording medium.

17. The method of claim 11, wherein the SUL covers a surface portion of the pre-seed layer and wherein the surface portion covered by the SUL is oxidized.

18. The method of claim 11, wherein the SUL comprises a material selected from the group consisting of: cobalt, iron, molybdenum, tantalum, niobium, boron, chromium, and combinations thereof.

19. The method of claim 11, wherein the SUL is configured to provide a return path for a magnetic field applied to the magnetic recording medium during a write operation.

20. A magnetic recording medium, comprising:
   a non-conducting substrate;
   an oxidized metal pre-seed layer on the non-conducting substrate, wherein a top portion of the oxidized metal pre-seed layer has an oxygen atomic percentage in the range of 40 to 80 (at %);
   a soft magnetic underlayer (SUL) on the oxidized metal pre-seed layer;
   one or more intermediate layers on the SUL; and
   at least one magnetic recording layer on the one or more intermediate layers.

21. A magnetic recording device, comprising:
   the magnetic recording medium of claim 20; and
   a recording head configured to write information to the magnetic recording medium.

22. The magnetic recording medium of claim 20, wherein the oxidized metal pre-seed layer comprises one or more of oxidized CrTi or oxidized NiTa.

23. The magnetic recording medium of claim 20, wherein the SUL covers a surface portion of the oxidized metal pre-seed layer and wherein the surface portion covered by the SUL is oxidized.

24. The magnetic recording medium of claim 20, wherein the top portion of the pre-seed layer that is oxidized has a thickness in the range of 0.3 nanometers (nm) to 3 nm.

* * * * *